(No Model.)
H. BREER.
APPARATUS FOR DESICCATING ANIMAL MATTER FOR FERTILIZERS.
No. 274,902. Patented Apr. 3, 1883.
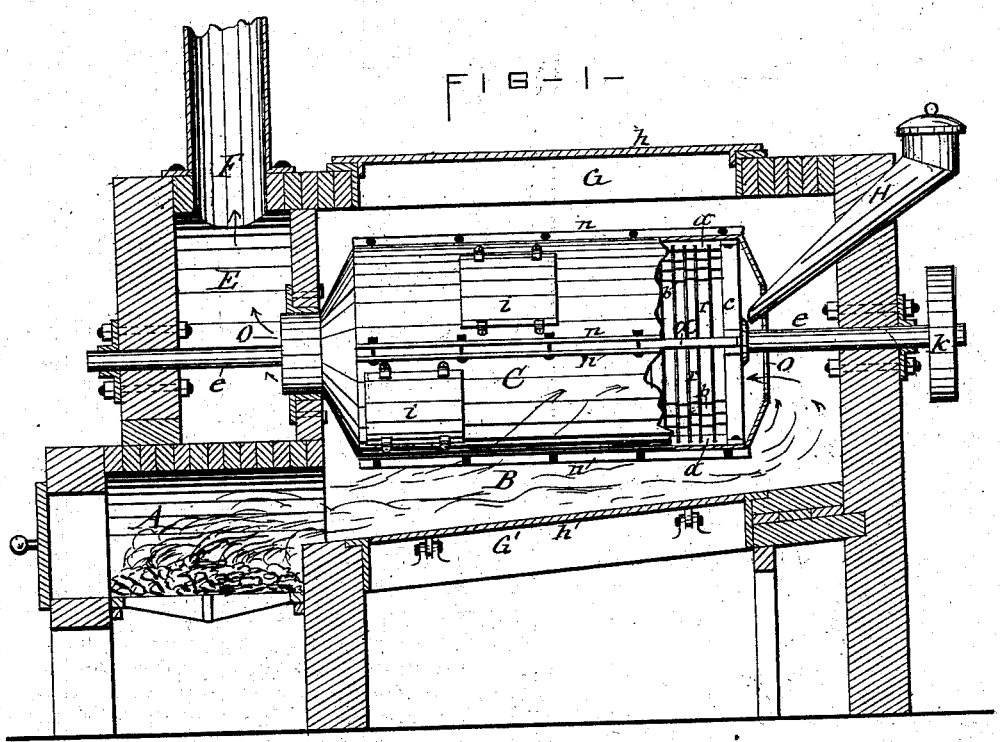
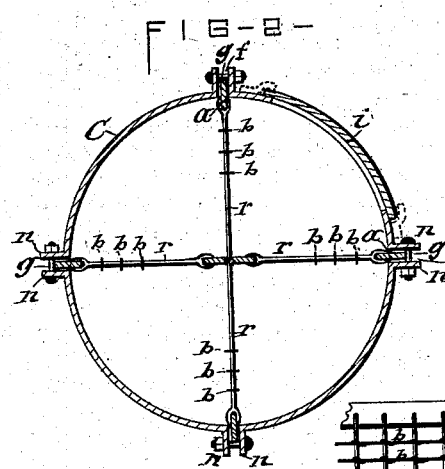
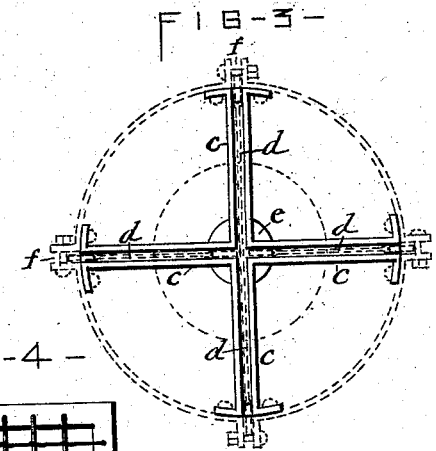
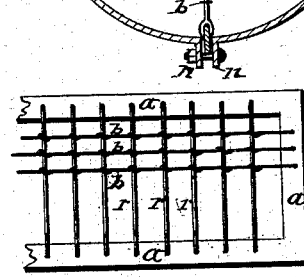
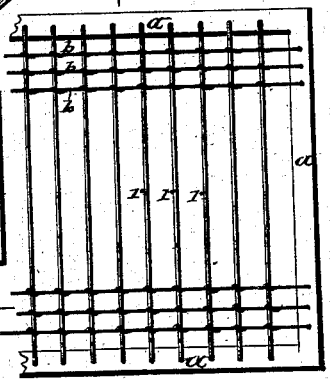
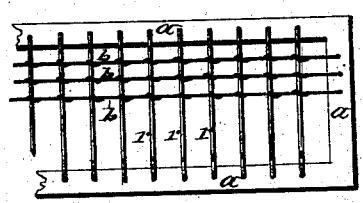
WITNESSES
Wm. C. Raymond
C. H. Duell
INVENTOR
Henry Breer
per Duell, Laass & Hey
his Attys

UNITED STATES PATENT OFFICE.

HENRY BREER, OF SYRACUSE, NEW YORK, ASSIGNOR TO CAROLINE H. BREER, OF SAME PLACE.

APPARATUS FOR DESICCATING ANIMAL MATTER FOR FERTILIZERS.

SPECIFICATION forming part of Letters Patent No. 274,902, dated April 3, 1883.

Application filed June 17, 1882. (No model.)

*To all whom it may concern:*

Be it known that I, HENRY BREER, of Syracuse, in the county of Onondaga, in the State of New York, have invented new and useful Improvements in Apparatus for Desiccating Animal Matter for Fertilizers, of which the following, taken in connection with the accompanying drawings, is a full, clear, and exact description.

This invention relates to devices for drying or desiccating animal matter for fertilizers, and has, more particularly, reference to the apparatus for which I have obtained Letters Patent of the United States, No. 255,925; the object of my present invention being to adapt the desiccating-cylinder for treating scraps and fine particles of animal matter, as well as large chunks and bones, and to render the said cylinder more effective generally in its operation, as hereinafter more fully explained.

Referring to the annexed drawings, Figure 1 is a longitudinal section of the desiccating apparatus, a portion of the cylinder being broken away to illustrate the internal construction. Fig. 2 is an enlarged transverse section of the revolving cylinder. Fig. 3 is an inner face view of the spider on the same scale; and Fig. 4 is a detached view of the wire-netting and its sustaining-frame, also on the same scale.

Similar letters of reference indicate corresponding parts.

A represents a fire-arch, which communicates with a large combustion-chamber, B, in which latter the revolving cylinder C is arranged, said cylinder being provided at opposite ends with an opening, O, which allows the products of combustion to pass from the combustion-chamber through the cylinder and to the smoke-box E and stack F. The cylinder C in this case is supported by two spiders, c c, secured to the interior of the cylinder, respectively, at opposite ends thereof, only one of said spiders, however, being illustrated in the annexed drawings, these spiders having fixed to the center of their outer sides a trunnion, e, by which the cylinder C is journaled in suitable bearings in the end walls of the apparatus, the extension of a shaft longitudinally through the center of the cylinder being thus dispensed with. One of said trunnions is provided on its outer end with a gear or pulley, k, by which the requisite rotary motion can be transmitted to the cylinder C. The inner face of the spider c is provided with a diametrical groove or way, d, extending the length of the spider-arms, for the purpose hereinafter explained. The cylinder C, I form of segments extending from one spider-arm to the other and rigidly attached thereto, and having a slot or opening, f, between their adjacent longitudinal edges, coinciding with the outer ends of the ways d of the spider-arms. The wire-nettings b, which are to be arranged diametrically across the cylinder C, I attach to rectangular metallic frames a, formed of two parallel longitudinal bars, connected by cross-bars at their extremities, said frames reaching from one spider c to the other, and being adapted to pass edgewise through the slots f of the cylinder and slide with their end cross-bars endwise in the ways d of the spider-arms, the latter serving to guide said frames when being introduced into or removed from the cylinder and sustaining said frames within the cylinder. One of the frames a is of a width to reach diametrically across the cylinder and have its two longitudinal bars entering into two diametrically-opposite slots, f, of the cylinder, thereby bracing said frame longitudinally and maintaining the same straight. The other frames a a are only about half as wide as the first-mentioned frame, and reach from midway of the width of the latter radially outward and into the two other slots f of the cylinder. These two narrow frames a are, like the wide frame, inserted into and removed from the cylinder edgewise through the slot f, when required. To the long sides of the frames a are attached a series of metal rods, r r, extended across the frame, and serving to brace the same and to form the main or central part of the netting. To that portion of the rods r which is nearest the periphery of the cylinder I attach a number of wires, b b, extended the length of the frame a, and arranged a proper distance apart to form a suitable screen to retain and carry partly around with the rotating cylinder the lighter and finer particles of the substance under treatment. The frames a a, with the before-described netting, are inserted edgewise into the ways $d$ of the spider-arms, and secured therein by clamp-bolts $g$, passed through outward flanges $n$ on the longitudinal edges of the segments of the cylinder C, said bolts at the same time serving to tie said segments together.

It will be observed that by the employment of the trunnions $e$ on the outer side of the spiders $c$, I dispense with the long shaft heretofore extended through the cylinder, and am enabled to utilize the entire width of the cylinder for the occupation of the diametrically-arranged nettings, which serve to stir and break up the substance under treatment.

The construction of the netting secured to frames arranged removably in the slots or ways of the spider-arms allows me to use interchangeable nettings of different grades, according to the nature of the substance to be treated, fine nettings being preferred for the treatment of scraps and coarse nettings for large chunks of flesh and bones. The shell of the cylinder C, I provide with a series of ports, $i\ i$, arranged at different points of its circumference and of its length, so that access can be had to the interior thereof and its contents may be discharged at any desired point of its length. The top and bottom of the combustion-chamber I provide each with an opening, $G\ G'$, extended the length of the cylinder C, and place over said openings a removable cover, $h$, thus greatly facilitating the approach to the interior of the cylinder, as well as the discharge of the desiccated substance. The substance to be desiccated is introduced in the cylinder by the spout H, having its reception end outside of the apparatus and its delivery communicating with the end of the cylinder C.

Having described my improvements, what I claim is—

1. The combination of the cylinder C, having longitudinal slots $f$, the frames $a\ a$, removably inserted therein, and the wire-netting $b$, secured to said frames, substantially as and for the purpose set forth.

2. The combination, with the cylinder C, having longitudinal slots $f$, of the radial arms $c$, provided with the way or groove $d$, the frames $a$, removably seated in said ways, and the wire-netting $b$, attached to the frames $a$, substantially as described and shown.

3. The combination, with the cylinder C, of the spiders $c$, provided with trunnions $e$ on one side and with diametric ways or slots $d$ on the opposite side, and the wire-netting frames $a\ b$, extended diametrically across the cylinder and removably seated in the ways $d$ of the spiders, substantially as shown and set forth.

4. The wire-netting frames $a\ b$, in combination with the spiders $c$, having ways $d$, the cylinder C, formed of segments having the opening $f$ between their adjacent edges, and clamps $g$, for tying the segments together, substantially as described and shown.

5. The combination and arrangement, with the furnace A, of the combustion-chamber B, having the top and bottom openings, G and G', extended the length of the cylinder C, and provided with removable covers $h\ h$, and the cylinder having a series of ports, $i\ i$, at different points of the circumference and of the length of the cylinder, substantially in the manner shown and described, for the purpose set forth.

In testimony whereof I have hereunto signed my name and affixed my seal, in the presence of two attesting witnesses, at Syracuse, in the county of Onondaga, in the State of New York, this 7th day of June, 1882.

HENRY BREER. [L. S.]

Witnesses:
C. H. DUELL,
WM. C. RAYMOND.